March 14, 1972    J. J. DOMICONE    3,649,443

METHOD OF BONDING GLASS TO VINYL FABRIC

Filed Oct. 8, 1970

INVENTOR.
Joseph J. Domicone
BY
ATTORNEY

United States Patent Office 3,649,443
Patented Mar. 14, 1972

3,649,443
METHOD OF BONDING GLASS TO VINYL FABRIC
Joseph J. Domicone, Horseheads, N.Y., assignor to Corning Glass Works, Corning, N.Y.
Continuation-in-part of application Ser. No. 750,573, Aug. 6, 1968. This application Oct. 8, 1970, Ser. No. 79,138
Int. Cl. B32b 17/06, 27/08; B60j 1/18
U.S. Cl. 161—193
8 Claims

ABSTRACT OF THE DISCLOSURE

This invention relates to a method for bonding vinyl material to a glass article. More particularly, the method of this invention comprises a four step process wherein: (1) the glass surface is contacted with a silane coupling agent; (2) the so-reacted surface is contacted with a phenolic resin primer coating; (3) a vinyl plastisol coating is applied thereover; and (4) the vinyl material is bonded to the plastisol adhesive system.

---

This application is a continuation-in-part of my pending application Ser. No. 750,573, filed Aug. 6, 1968, and now abandoned.

The convertible car, having a flexible roof which may optionally be kept in the "top-up" or "top-down" position, is one of the popular automobiles on the road. Typically, the flexible roof is made of a multiply vinyl fabric and includes a rear window to permit rear viewing when the top is up. Until recently, the rear window was made of a transparent plastic capable of withstanding mechanical shock without breaking. But because the plastic window was easily abraded, hard to clean, and degraded and turned opaque upon exposure to sunlight, a chemically tempered safety glass rear window was developed.

Heretofore, polysulfide adhesives were used in mounting and installing glass windows in automobiles. However, there are some disadvantages to the polysulfide system. For example, an objectionable feature is that the sealant is a two component product, a liquid polysulfide, and an activator, which must be mixed together before using to polymerize the polysulfide and solidify it. Improper mixing in ingredients or an insufficient amount of the curing agent, results in an unsatisfactory seal. Temperature and humidity affect the work life and the cure rate of the adhesive. This is another disadvantage for it normally takes a minimum of twenty-four hours under controlled atmospheric conditions for the adhesive to become completely cured.

In accordance with the invention, I have discovered a method of attaching a chemically strengthened glass window to a vinyl fabric comprising the steps of treating the surface of the glass with a dilute aqueous solution of gluconic acid, reacting the treated surface with a silane coupling agent, then applying to the surface a primer coating and thereafter applying to the coated surface a vinyl plastisol. My invention also includes the bonded article made by the novel method.

The invention is more clearly understood from the following description taken in conjunction with the accompanying drawing in which.

Figure 1:
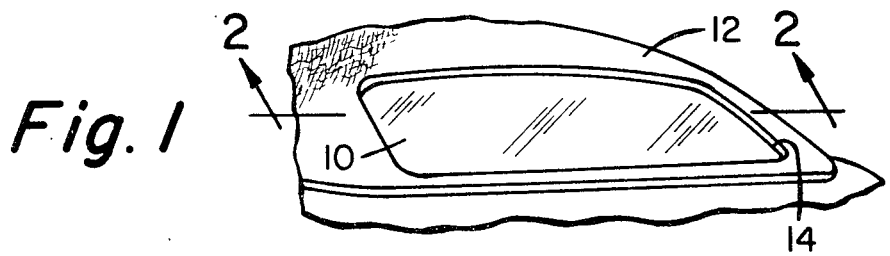
FIG. 1 is a view of a rear window installed and mounted in the convertible top of an automobile.

Referring now to FIG. 1, which shows the rear window of a convertible car with the roof in the "top-up" position, the glass rear window 10 is attached to a vinyl fabric roof 12 by a bonding means 14. The window 10 is made from a chemically strengthened alkali aluminosilicate glass. Typically, such glasses are produced by a method involving large or small ion exchange at the surface of the glass. For example, a sodium-aluminosilicate glass is treated with molten potassium nitrate to exchange the larger potassium ion for the smaller sodium ion. A discussion of this procedure is given by Nordberg et al., J. Am. Ceram. Soc., vol. 47, No. 5, May 1961, p. 215. The roof 12 is made of a multiply vinyl fabric.

Figure 2:
FIG. 2 is a cross sectional view taken along the line 2—2 of FIG. 1 and in exaggerated proportions illustrates the bonded article of the invention.
Figure 3:
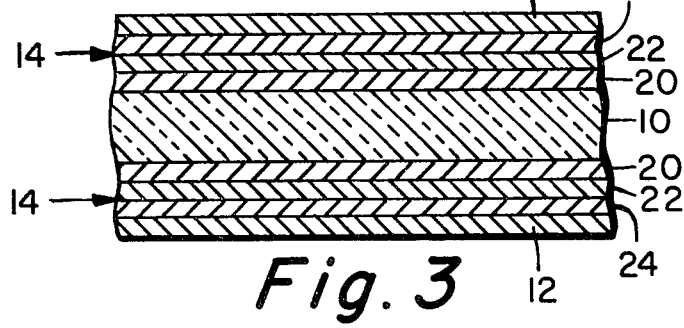
FIG. 3 is an enlarged fragmental cross sectional view taken along line 3—3 of FIG. 2.

The bonding means 14 which is composed of coatings 20, 22, and 24, is more clearly illustrated in the cross sectional view of FIG. 2 and the enlargement shown in FIG. 3. The chemically strengthened glass 10 is initially cleaned at the surface to be mounted with a dilute aqueous solution of gluconic acid. The cleaned surface is then treated with a silane coupling agent which becomes chemically bonded to the glass and forms an inner coating 20. A primer coating 22 is then applied over the inner coating 20 to act as an intermediate coating which facilitates the bonding of a vinyl plastisol coating 24. After the outer plastisol coating 24 has been applied, the multiply vinyl fabric 12 is bonded to the glass by conventional techniques or by dielectric sealing.

While the drawing illustrates the bonded article, I will now give a more detailed description of the bonding procedure. The chemically strengthened glass is initially cleaned to prepare the surface for bonding. It is recommended to clean the glass in a detergent solution and then to wash with a dilute (10%) gluconic acid solution heated to about 90°–95° C. The glass should be thoroughly rinsed with distilled water and dried. However, the gluconic acid treatment may be eliminated provided a pristine surface (the condition of the glass just after it has been prepared) is used.

In order to obtain satisfactory bonding of the primer to the glass, it is necessary to initially treat the glass with a silane coupling agent. Such agents react with the silanol groups available on the glass surface and form a strong durable water resistant bond. The unreacted portion of the coupling agent is then capable of reacting with an organic resin. Representative coupling agents are gamma-aminopropyltriethoxysilane (Union Carbide A-1100 silane) and n-(trimethoxysilylpropyl) ethylenediamine (Dow Corning Z-6020 silane). These are applied as dilute solutions containing about 0.1–10% of the silane in preferably an alcohol solvent, e.g., methanol, ethanol, etc., and may also be used in alcohol-water mixtures. After applying the coating solution to the glass, the solvent should be removed by air drying.

Thereafter, a primer coating is applied to the coated glass as an intermediate coating since the vinyl plastisol will not adhere to the glass in the absence of a primer. Suitable primers therefor consist of commercially-available phenolic resins produced through the reaction of phenol with formaldehyde in the presence of a catalyst or curing agent such as paraformaldehyde, hexamethylenetetramine, or an isothiocyanate. However, the choice of resin is not critical to the successful operation of the invention. The solvent for the primer can be methyl ethyl ketone, cyclohexanone, or such aromatics as xylene, toluene, etc. Representative primers include B. F. Goodrich A-1104-B which utilizes methyl ethyl ketone as the solvent and Ohio Sealer Chemical Corporation 2-842 wherein cyclohexanone constitutes the solvent. The former product utilizes paraformaldehyde as the catalyst whereas the latter employs an isothiocyanate.

The addition of small amounts of a pigment, i.e., up to about 1% by weight, to the primer improves the resistance of the adhesive system to ultra-violet light. A typical pigment is aluminum powder coated initially with a 0.5% solution of epoxycyclohexylethyltrimethoxysilane in a 1:9 water-ethanol solvent. The primer is applied such that the final coating has a thickness of 0.003″–0.009″. After application, the primer is cured. A representative curing schedule would contemplate heating at a temperature of about 350°–400° F. for a period of about 3–9 minutes.

After the primer has been dried and cured, a vinyl plastisol coating is applied thereover. As used herein, a "plastisol" is a vinyl chloride polymer-plasticizer paste without a solvent. Typically, the plastisol composition consists of finely-divided particles of a vinyl resin comprising a homopolymer of vinyl chloride or, useful but somewhat less desirable, a copolymer of vinyl chloride with a minor amount of a copolymerizable monomer such as polyvinyl acetate to which a plasticizer therefor is added in an amount of about 25–55 parts by weight per 100 parts by weight of the resin. Polyvinyl chloride resins are widely-available commercially and the choice thereof does not appear to substantively affect the results obtained. Plasticizers commonly used with polyvinyl chloride resins include: dioctyl phthalate, di(2-ethylhexyl) phthalate, and other phthalic anhydride esters. In addition, the plastisol will normally contain a stabilizer selected from the general class of powdered mixed metallic salts, e.g., such heavy metal soaps as barium stearate and lead stearate, and may also include such chelate combinations as dialkyltin dicarboxylate and dialkyltin mercaptides. Finally, the plastisols may contain a pigment, such as $TiO_2$ or $CaCO_3$, and an ultra-violet stabilizing agent. Useful ultra-violet light absorbers include Cyasorb UV 531 light absorber which is a white crystalline solid having the formula 2-hydroxy-4-octyloxy benzophenone and which is readily soluble in methyl ethyl ketone. Another very effective ultra-violet radiation absorber is Unival M–40 which is composed of crystalline powders that are readily soluble in most organic solvents.

After application, the plastisol is cured through a heating schedule. A typical curing schedule would contemplate heating to a temperature of between about 350°–400° F. for a period of about 7–12 minutes. The vinyl plastisol coating is preferably laid up in such a manner as to have a dry thickness of about 0.020″–0.025″. The vinyl fabric is then bonded to the plastisol through conventional procedures.

Many vinyl plastisols are available commercially. Two representatives of such are Plastisol 7–1806 and Plastisol 7–1806–4 produced by Ohio Sealer Chemical Corporation. The former utilizes dialkyl phthalate as a plasticizers, lead stearate as a stabilizer and dialkyltin mercaptides as chelating combinations. The latter employs dioctyl phthalate as a plasticizer, a barium-cadmium stearate as a stabilizer, and dialkyltin dicarboxylates as chelating combinations.

My invention is further illustrated by the following examples:

EXAMPLE I

Test samples were prepared on 2½″ x 8″ panels of chemically strengthened glass sold under the designation Corning Code 0313. The glass is formed from a sodium aluminosilicate glass which has been subjected to ion-exchange in a molten potassium nitrate bath.

The glass panels were initially cleaned by washing with a warm detergent solution and followed by a 10 minute dip in a 10% gluconic acid solution at 90°–95° C. The panels were rinsed with distilled water and air dried.

A 0.1% solution of gamma - aminopropyltriethoxysilane (Union Carbide A–1100 silane) was prepared by mixing with a solvent containing 90% ethanol and 10% water. A selected portion of the panel to which the vinyl material is to be bonded was treated with the silane coupling agent. The glass surface was then air dried.

A primer was prepared from the following formulation:

| Ingredient: | Parts by weight |
| --- | --- |
| Phenolic resin (B. F. Goodrich A–1104–B) | } 100 |
| Paraformaldehyde catalyst | |
| Methyl ethyl ketone | 300 |
| Aluminum powder [1] | 1 |

[1] Coated initially with 0.5% solution of epoxycyclohexylethyltrimethoxysilane.

The primer applied to the treated glass and baked for 6 minutes at a temperature of 400° F. The cured primer coating had a thickness of about 5 mils.

A plastisol formulation was prepared as follows:

| Ingredient: | Parts by weight |
| --- | --- |
| Polyvinyl chloride resin (Ohio Sealer Plastisol 7–1806–4) | 100 |
| Plasticizer (dioctyl phthalate) | 55 |
| Calcium carbonate | 50 |
| Barium-cadmium stearate | 1 |
| UV absorber (Cyasorb UV 531) | 1 |

The plastisol was applied over the primer to give an overall thickness of 25–30 mils. This coating was cured for 10 minutes at 400° F.

Thereafter a piece of multiply vinyl fabric was bonded to the plastisol adhesive system by applying heat and pressure. The sample panels were subjected to a series of tests to determine the strength of the bond. A one-half inch wide test sample is able to withstand a peel test of 10 lbs. per inch linear width after each of the following exposures:

(a) Ten cycles of a treatment of one hunderd hours weatherometer UV exposed at 160° F. and seven days in humidity cabinet at a temperature of 100° F. and 100% relative humidity;

(b) Fourteen days in dry heat at 158° F.;

(c) One hundred hours salt spray;

(d) Hot pulls with sample exposure to 15–30 minutes at 175° F.; and (e) Cold pull with sample exposed to −20° F.

EXAMPLE II

Test glass panels 2½″ x 8″ were prepared from the same chemically strengthened glass recited in Example I and cleaned, in a like manner. A 0.2% solution of n-(trimethoxysilylpropyl)ethylenediamine (Dow Corning Z–6020 silane) was compounded by blending into a solvent of 90% ethanol-10% water. A selected portion of the panel was treated therewith in preparation for the bonding of the vinyl material thereto.

A primer of the following formulation was compounded:

| Ingredient: | Parts by weight |
| --- | --- |
| Phenolic resin (Ohio Sealer 2–842) | } 100 |
| Isothiocyanate catalyst | |
| Cyclohexanone | 300 |
| Aluminum powder [1] | 1 |

[1] Coated initially with 0.5% solution of epoxycyclohexylethyltrimethoxysilane.

This procedure was applied to the previously-treated glass panels and baked for 9 minutes at 375° F. to yield a cured coating having a thickness of about 0.007″.

A plastisol combination was thereafter formulated as follows:

| Ingredient: | Parts by weight |
| --- | --- |
| Polyvinyl chloride resin (Ohio Sealer Plastisol 7–1806) | 100 |
| Plasticizer (dialkyl phthalate) | 55 |
| Calcium carbonate | 50 |
| Lead stearate | 1 |
| UV absorber (Cyasorb UV 531) | 1 |

This plastisol combination was then applied over the primer coating to yield an overall thickness of about 0.020"–0.025" and cured for 12 minutes at 350° F.

Thereafter, the vinyl fabric was bonded to the plastisol adhesive system in the conventional manner through the application of heat and pressure. The so-bonded panels withstood the peel test described in Example I.

Figure 4:
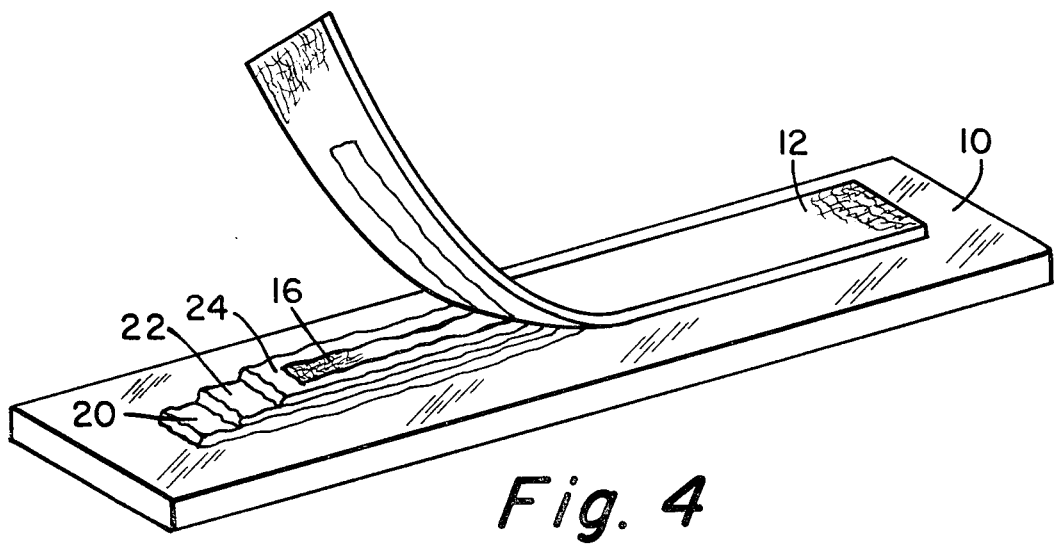
FIG. 4 is a view of a test panel illustrating the tenacity of the bond produced by the method of the present invention.

Referring now to FIG. 4, a test panel prepared as described hereinabove is illustrated after a portion of the vinyl fabric 12 has been pulled off. The chemically strengthened glass 10 is shown coated with the inner coating 20 of the silane coupling agent, an intermediate primer coating 22 and the outer vinyl plastisol coating 24. The tenacity of the bond can be observed by the separation of the inner ply 16 from the multiply vinyl fabric 12 rather than a failure in the glass-bonding means-fabric bond.

It will be apparent to those skilled in the art that many variations and modifications of the invention as hereinabove set forth may be made without departing from the spirit and scope of the invention. The invention is not limited to those details and applications described, except as set forth in the appended claims.

I claim:

1. An article comprising a chemically strengthened glass attached to a vinyl fabric by a bonding means, said means comprising an inner coating of a silane coupling agent reacted with the surface of the glass, an intermediate coating of a primer coating comprising a cured phenolic resin, and an outer coating of a cured vinyl plastisol.

2. The article of claim 1 wherein said glass is a sodium aluminosilicate subjected to an ion exchange strengthening by exchange of potassium ions for sodium ions on the surface of the glass.

3. A method for bonding a chemically strengthened glass to a vinyl fabric comprising:
   (a) reacting the surface of the glass to be bonded with a silane coupling agent;
   (b) applying to the so-reacted surface a primer coating consisting essentially of a phenolic resin with a catalyst therefor, an organic solvent, and up to about 1% by weight of a pigment;
   (c) curing said primer coating;
   (d) applying over said primer coating a plastisol consisting essentially of a finely-divided vinyl resin composed of a homopolymer of vinyl chloride or a copolymer of vinyl chloride with a minor amount of a copolymerizable monomer, with a plasticizer therefor in an amount of 25–55 parts by weight per 100 parts by weight of the resin;
   (e) curing said plastisol coating; and
   (f) bonding said vinyl fabric to said plastisol coating.

4. The method of claim 3, wherein the surface of the glass to be bonded is initially treated with a dilute aqueous solution of gluconic acid.

5. The method of claim 3, wherein the silane coupling agent is applied as a dilute solution of about 0.1–10% by weight of the silane and containing an alcoholic solvent.

6. The method of claim 5 wherein said coupling agent is gamma-aminopropyltriethoxysilane.

7. The method of claim 3 wherein said plastisol contains a stabilizer of a heavy metal soap and a chelate combination, a pigment, and an ultra-violet light stabilizer.

8. The method of claim 7 wherein said primer coating has a thickness of 3–9 mils and is subjected to a curing schedule of about 350°–400° F. for a period of about 3–9 minutes, and said plastisol coating has a thickness of 20–25 mils and is subjected to a curing schedule of about 350°–400° F. for a period of about 7–12 minutes.

References Cited

UNITED STATES PATENTS

| | | | |
|---|---|---|---|
| 3,217,065 | 11/1965 | Higashi | 260—826 |
| 3,241,277 | 3/1966 | Coppock | 52—208 |
| 3,306,800 | 2/1967 | Pleuddemann | 156—329 |
| 3,318,757 | 5/1967 | Atwell | 161—193 |

HAROLD ANSHER, Primary Examiner

D. J. FRITSCH, Assistant Examiner

U.S. Cl. X.R.

52—208; 156—108, 315; 161—208, 248, 254